Patented Apr. 14, 1925.

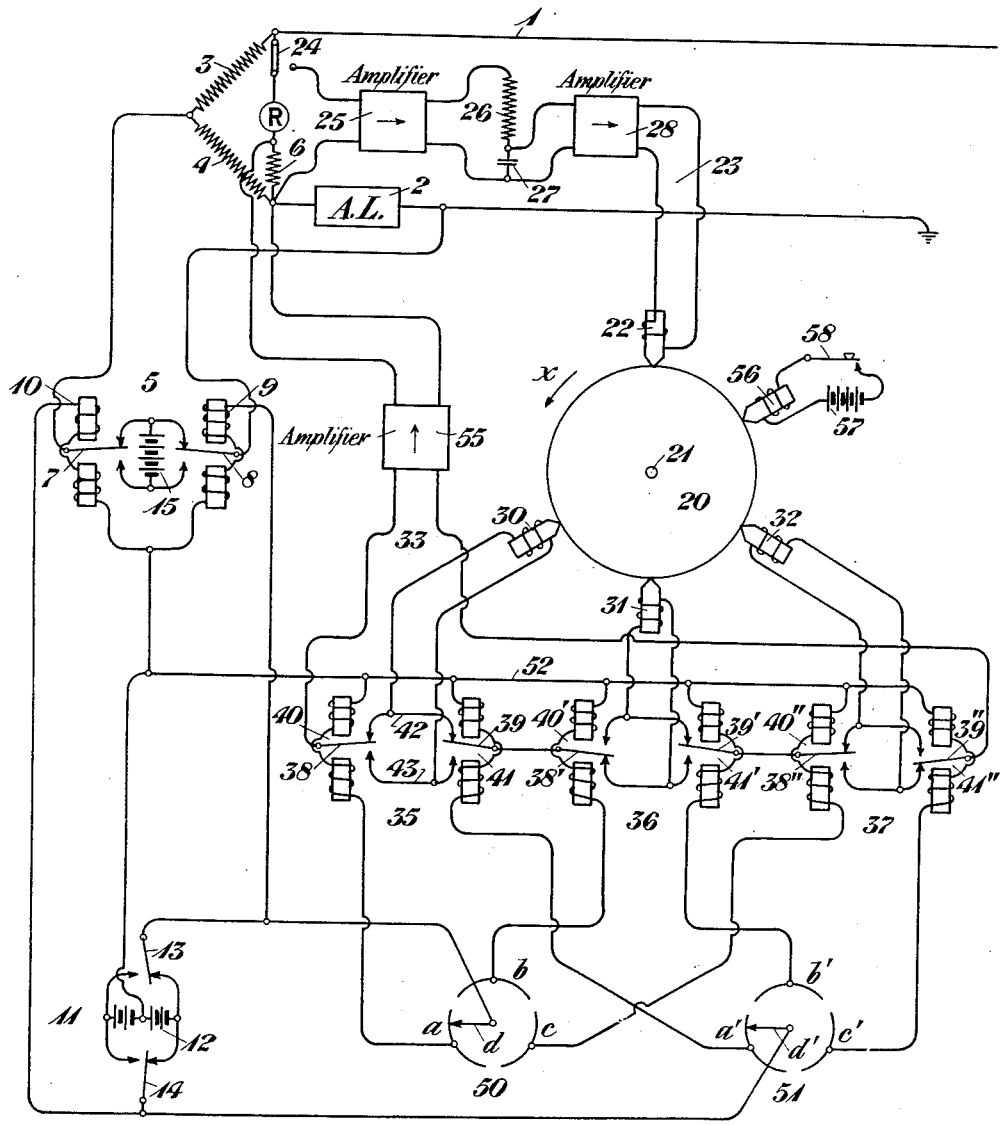

1,533,091

UNITED STATES PATENT OFFICE.

OTTO B. BLACKWELL, OF GARDEN CITY, NEW YORK, ASSIGNOR TO AMERICAN TELEPHONE AND TELEGRAPH COMPANY, A CORPORATION OF NEW YORK.

DUPLEX SIGNALING SYSTEM.

Application filed November 14, 1919. Serial No. 337,961.

*To all whom it may concern:*

Be it known that I, OTTO B. BLACKWELL, residing at Garden City, in the county of Nassau and State of New York, have invented certain Improvements in Duplex Signaling Systems, of which the following is a specification.

This invention relates to signaling systems, especially to those arranged for duplex operation. Its object is to improve the signaling in such systems by overcoming the duplex unbalance.

In duplex systems it is common practice to set up an artificial line to balance the actual line and to then so relate the receiving device to the actual and artificial lines that it does not record the outgoing current at that station. In practice, however, and particularly in connection with submarine cables, it is difficult to set up an artificial line which so exactly represents the impedance of the actual line as to prevent currents from the local transmitter of sufficient magnitude to cause serious interference, from affecting the receiving device. The present invention proposes to overcome these unbalance currents in the receiving device by making a record of the wave form of the unbalance voltage across the receiving device and then applying to the receiving circuit a voltage of like wave form and of proper phase with respect to the disturbing voltage to counteract its effect on the receiver.

The accompanying drawing shows diagrammatically a system embodying the invention.

The real line is represented at 1 and the usual artificial balancing line at 2. 3—4 are the ratio arms of the duplex bridge and 5 the sending device connected as usual to the apex of the ratio arms. This sending device is here illustrated as of the form commonly used in cable transmission and capable of giving either positive or negative impulses. The receiving device R is connected as usual across the extremities of the ratio arms 3 and 4, a resistance 6 being connected in series therewith in the present instance to facilitate the imposition of the correcting voltage on this circuit, as hereinafter described. The two switcharms 7 and 8 of the sending device are controlled by the relay windings 9 and 10 which are under the control of the transmitter 11. One terminal of each of the windings 9 and 10 is connected to the midpoint of the battery 12 of the transmitter while the other terminal of each is connected to one of the switcharms 13—14 of the transmitter, each of which may be moved to connect with either pole of the battery 12. In this way either of the switcharms 7 and 8 may be moved from the position shown in the drawing to the opposite contact thus enabling the battery 15 to be connected to the transmission line in either a positive or negative sense. Where a code using positive, negative and "spacing" impulses is employed, the spacing impulses are represented by intervals when both arms are either up or down. In practice the switcharms 13 and 14 of the transmitter are commonly machine operated so that the signal impulses are all equal and equally spaced.

In the embodiment of the invention here shown it is assumed that all of the signal impulses are of the same duration, the signals being formed by using positive, negative and spacing or zero impulses in accordance with known practice, and it is also assumed that the sending device is machine-driven so that the impulses are equally spaced, although it will be understood that in its broader aspects the invention is not limited to this kind of transmission. The given impulse, whether positive or negative, from the transmitter 5 will produce a faint impulse in the receiving circuit whose form, amplitude and duration are due to the characteristics of the line and the degree of balance between the real and artificial lines. For the purpose of illustration it may be assumed that the impulse in the receiver due to the unbalance is represented by a comparatively sudden increase of current which gradually fades to zero, the polarity of this impulse being determined by the polarity of the impulse transmitted, but since all impulses are of the same form and duration except for their polarity, all of the unbalanced current impulses in the receiver will also be of the same form and duration. It will therefore suffice for the purposes of counteracting the unbalance effect, to make a record of the impulse in the receiving circuit produced by either a positive or a negative signal impulse, or by a succession of these impulses superimposed to form a composite record, and to then reproduce the impulse from the record and apply it in the form of an opposing voltage in the receiving circuit. The unbalanced voltage in the receiver and the reproduced voltage will thus be equal and opposite throughout their duration and will entirely neutralize each other in the receiver.

The means for recording the wave form of the unbalance voltage across the receiver is shown in the present instance as a form of the well known telegraphone apparatus including a steel disc 20 mounted to rotate on the axis 21 and having near its periphery a recording magnet 22. This magnet is in a circuit 23 which may be connected at will across the receiving terminals by means of the switch 24. This circuit, traced from the transmission line leads first to an amplifier 25 whose output circuit includes in series a resistance 26 and a condenser 27. A second amplifier 28 is connected across the terminals of the condenser 27 and the output circuit of the amplifier 28 is connected to the terminals of the magnet 22. In reproducing the record from the disc there is a phase displacement of the generated voltage owing to the fact that the voltage produced in the reproducing magnet is proportional to the rate of change of the magnetic field rather than its value. It is, therefore, convenient to produce a phase displacement between the unbalance voltage across the receiver R and the record thereof produced on the disc 20, which shall be in the opposite direction from that which occurs in the reproducing. This is accomplished by the network 26—27 in cooperating with the amplifier 28. For this purpose the impedance of the resistance 26 should be very large compared with the impedance of the condenser 27 so as to avoid a phase displacement between the current and the voltage in the output circuit of the amplifier 25. It being understood that the amplifier 28 is of the well known thermionic type in which the grid is maintained negative with respect to the filament, it will be seen that the device lends itself admirably to the production of the phase displacement desired inasmuch as its input circuit takes no current. The phase of the input voltage will, therefore, be exactly the phase of the voltage across the condenser 27. This voltage, while small, will, in accordance with well understood principles, be displaced 90° from the voltage of the output circuit of the amplifier 25. The inductance of the recording magnet 22 is made small in proportion to the resistance of the output circuit of amplifier 28 so that the phase displacement due to the inductance may be disregarded.

If the disturbance due to the unbalance current from a transmitted impulse persisted no longer than the duration of the signal impulse itself, the unbalance due to successive impulses could be perfectly counteracted by a single reproducing device arranged to reproduce the recorded impulse anew, beginning with each transmitted impulse, provided only that the arrangement was such that the polarity of the reproduced impulse could be reversed whenever the polarity of the signal impulse was reversed. Ordinarily, however, the unbalance effects of a transmitted impulse persist longer than the duration of the impulse itself, so that it overlaps upon the period of transmission of succeeding impulses. It is desirable, therefore, to have more than one reproducing device so that a reproduction of the unbalanced voltage may be started at the instant each succeeding impulse is started and may continue as long as the unbalance effect continues. In this way the reproducer generating the first counteracting voltage will have finished reproducing the record before it is called upon to again start the reproduction for a later signal impulse and the two or more reproduced impulses may be superimposed in the counteracting circuit and applied to the receiver just as the unbalance impulses in the receiving circuit itself will be superimposed in part by reason of the longer duration of the unbalanced effect.

In the accompanying drawing an arrangement is illustrated capable of taking care of an unbalance current which persists (to an amount which should be taken care of) for a period as much as three times the length of a transmitted impulse. It is obviously unnecessary to have three separate records of the unbalance impulse for this purpose since the requirements are satisfied by the use of three separate reproducers acting upon the same impulse record. By an obvious variation of the apparatus shown an unbalanced current of any duration can be provided for. In the form here illustrated the recording disc of the telegraphone is made sufficiently large to record two separate and complete records of the unbalanced current, although this is merely a matter of convenience, as obviously a single record occupying the complete circumference of a recording disc would serve the purpose; the essential requirement being in any case that the record or records on the disc be spaced equally about its circumference (assuming, of course, a constant rate of travel) and that the reproducing magnets, where more than one are used, be spaced about the circumference at intervals corresponding to the travel of the disc between the beginnings of successive impulses. Where a single record occupied the entire circumference of the disc the three reproducers would be spaced equally about its circumference, i. e., at intervals of 120 degrees. Where two records are used the three reproducers will be spaced equally about the semi-circumference, i. e., at intervals of 60 degrees. This arrangement of reproducers is shown in the drawing at 30, 31 and 32, each being a magnetic reproducer of a known form. As will be clear from what has already been said, the rotation of the disc should be at a uniform rate corresponding to the uniform rate of transmission of impulses. This may conveniently be accomplished by connecting both the transmitter and the disc to the same driving mechanism, such as is common in the automatic transmission of signals. In any case the disc should be so driven and the angular adjustment of the disc with respect to the reproducers should be such that the beginning of one of the records of the unbalance impulse comes opposite one of the reproducing magnets in the proper time relation to the beginning of a signal impulse.

As above intimated, it is necessary to apply the reproduced voltage to the receiving circuit in either a positive or negative sense, depending upon the polarity of the signal impulse, whose unbalance effect the particular reproduction is to counteract. For this purpose a reversing switch is associated with each reproducer and controlled by the sending switches 13 and 14 which control the polarity of the transmitted impulse. Where three reproducers are used for the reason above indicated, it is of course necessary to provide a reversing switch of this kind, or its equivalent, for each reproducer and so connect the three switches to the same circuit 33 that the reproduced impulses may be superimposed in the circuit to the extent that they overlap at any given instant. The reversing switches should obviously be of a character to entirely eliminate a reproducer where the signal impulse is a spacing "impulse," without affecting the continuity of the circuit 33 for the other reproducers.

These results are accomplished by connecting to each of the reproducing magnets 30, 31 and 32 a reversing switch 35, 36 and 37 respectively, each corresponding in form to the transmitting switch 5. Each switch includes two vibrating arms 38 and 39, each constituting the tongue of a polarized relay, 40 and 41. The front contacts of the relays are connected together as at 42 and the back contacts together as at 43, and the reproducing magnet is connected across the conductors 42 and 43. The three reversing switches have their tongues 38 and 39, 38' and 39', 38" and 39" connected in series as indicated, and the counteracting circuit 33 to the outside tongues of the two outside switches so that the three reversing switches are in effect in series across the counteracting circuit. Obviously a parallel arrangement of the reversing switches might be used instead. It will be seen that in the series arrangement shown the circuit is always closed, whether a given reproducing magnet is included in the circuit or not. The tongues of the relays tend to remain in either position to which they may be moved by their respective controlling magnets.

If but one reproducing magnet were used its controlling switch magnets might be directly connected to the sending switches 13 and 15, so that the tongues of the reversing switch would be shifted in consonance with them. Where three reproducing magnets are used, the reversing switch for each must be connected to the sending switches 13 and 15, in turn so that each reproducing magnet shall be connected to the counteracting circuit 33 in the proper sense to counteract the unbalance effect of the particular signal impulse being transmitted. For this purpose the conductors leading from the switches 13 and 14 are provided with moving contacts $d$ and $d'$, which contact successively with terminals connected to the magnets of the reversing switches associated with the different reproducers. We have thus two commutators 50 and 51, each with three contacts, $a$, $b$, $c$, and $a'$, $b'$ and $c'$ respectively, the rotating parts of which should also be connected to the driving mechanism of the transmitter 11 so that the brushes $d$ and $d'$ pass to a new contact of the commutator with each transmitted impulse. At any given instant, as will be seen, the two brushes are connected to the two magnets controlling the reversing switch for a given reproducing magnet. All of the magnets of the reversing switches have one terminal connected to the center of the battery 12 by a conductor 52. By this arrangement it will be clear that for any movement of the tongues 13 and 14 of the transmitter, the tongues of the reversing switch 30, 36 or 37, which is at the moment connected to the transmitter by the commutators 50 and 51, will be arranged with respect to the reproducing magnet in the same manner that the tongues of the sending device 5 are arranged with respect to the source of energy 15, so that if a "spacing" impulse is transmitted that particular reproducing magnet is out of the circuit, if a positive impulse is transmitted that reproducing magnet is connected to the circuit 33 in one sense, and if a negative impulse is transmitted, that reproducing magnet is connected to the circuit 33 in the other sense.

An amplifier 55 is preferably connected in the circuit 33 between the reproducing magnets and the receiving circuit in order that the magnitude of the counteracting voltages may readily be made equal to the unbalance voltages in the receiving circuit, due to the transmitted impulses.

In order that the record on the disc 20 may be changed or renewed a wiping-out magnet 56 is provided adjacent to the disc, having in its circuit a battery 57 and a key 58.

To employ the arrangement above described a record of the unbalance voltage is first produced upon the disc 20. For this purpose transmission from the opposite end of the line is interrupted and the switch 24 is moved to bridge the amplifier 25 and the reproducing mechanism across the line. An impulse is then transmitted in the usual manner and the effect which would ordinarily be produced in the receiver R is recorded upon the disc 20. This record may be produced by either a positive or a negative impulse since the unbalance due to both is the same except for polarity, and the polarity of the reproduced impulse is taken care of by the reversing switches above described. Also, instead of a single impulse a succession of impulses may be recorded, thereby giving a record which is a composite of the effect of a number of transmitted impulses so that any slight peculiarity of a given impulse caused by some transient effect does not produce a noticeable effect upon the record.

When the record has been made the switch 24 is returned to the position shown in the drawing and the system is then ready to receive and transmit messages. If it be assumed that the disc 20 is rotating in the direction of the arrow $x$ and the angular position of the disc is so adjusted with respect to the driving mechanism that the beginning of one of the records of unbalance voltage reaches the point of the magnet 30 in the proper phase relation to the keys 13 and 14, which are transmitting the impulse, it will be seen that the magnet 30 will, by reason of the operation of the relay tongues 38 and 39, be connected across the circuit 33 in the proper manner to create in that circuit a voltage equal to the unbalance voltage produced by the transmitted impulse, and capable of opposing and eliminating it in the receiving circuit, if properly applied across the resistance 6 therein. The relay tongues 38 and 39 having been properly positioned by the operation of the switch tongues 13 and 14, will remain in that position until again effected by their controlling relays, when these are next connected to the tongues 13 and 14 during the transmission of a succeeding impulse. They will, therefore, leave the reproducing magnet 30 in the proper relation to the circuit 33 to continue its counteracting effect even after the beginning of a succeeding signal impulse produced by a movement of the tongues 13 and 14. So that in the meantime the controlling relays or the reproducing magnets 31 and 32 will successively be affected in like manner so that these magnets are also properly connected in the circuit to produce their counteracting effects, and since the unbalance voltage persists in the case here supposed for a period approximating three times the length of a signal impulse, the effects produced by the three reproducing magnets 30, 31 and 32 will likewise persist for the same period and will be superimposed in the circuit 33 to the same extent that the unbalance voltages in the receiver due to three succeeding signal impulses are superimposed; and the combined effects of the reproduced voltages in the receiving circuit will be at any instant equal and opposite to the effects of the unbalance voltage produced by three successive transmitted impulses.

It will be noted that the arrangement here shown and described in no way disturbs the perfection of the original balance produced by the artificial line 2, and that it acts only on the residual unbalance voltages and currents which remain after the original balance has been made as good as practicable in commercial operation. It is only necessary, therefore, to have an approximate likeness between the unbalance voltages and the correcting voltages. Theoretically it would be possible, of course, to operate a line with this device without any balancing artificial line. Ordinarily this would, however, be unprofitable because it would require a high degree of accuracy in recording and reproducing the unbalance voltages. It is obvious, however, that the present invention makes it practicable to use a comparatively simple form of artificial line, one which would balance the actual line for say a short range of fundamental frequencies, the remainder of the balance being taken care of by the means here shown.

If the receiving circuit is subject to currents due to induction from extraneous sources, it will be desirable to record on the disc 20 the effects of a number of successive signal impulses. These will exactly repeat on the recording disc, whereas the voltages due to extraneous sources will not repeat but will rather tend to neutralize each other. The record so produced will, therefore, be an approximately accurate reproduction of the unbalance voltage due to the signal alone.

The record on the disc 20 should be renewed often enough so that it may represent accurately the unbalance voltage appearing at the terminals of the receiving circuit at any given time, it being understood that the degree of balance varies from time to time with temperature and other variable conditions. It should also be renewed frequently enough so that the blurring or distorting effect of the reproducing mechanism on the records shall have no considerable effect upon the result. The last mentioned fault may readily be provided for by making the record on a master disc from which it is transferred to operating discs which may replace one another at desired intervals. An important phase of the invention, however, is the arrangement by which a new record of the unbalance on the line may be easily and quickly produced so that the changes in the degree of balance which are constantly occurring may be taken care of by altering the record used for counteracting the unbalance effect.

It will be obvious that the arrangement herein shown and described may be modified in many respects without departing from the spirit of the invention and the particular device and circuits here shown are, therefore, to be regarded as purely illustrative.

What I claim is:

1. The method of avoiding the effects of unbalance on the receiving circuit of a duplex transmitting system which consists in creating a voltage having an amplitude and wave form equal to the unbalance voltage and applying the created voltage to the receiving circuit in opposition to the unbalance voltage.

2. The method of counteracting the unbalance effect in the receiving circuit of a duplex transmitting system, which consists in recording the unbalance voltage across the receiving circuit due to a transmitted impulse, reproducing the recorded voltage at intervals corresponding to those of transmitted impulses and applying each reproduced voltage to the receiving circuit in a direction to counteract the unbalance due to the corresponding transmitted impulse.

3. In a signaling system, a main line, a transmitting circuit and a receiving circuit associated therewith for duplex operation, means for recording the unbalance voltage caused in the receiving circuit by a transmitted impulse, and means for applying to the receiving circuit a voltage corresponding to said record in a direction to counteract the original unbalanced voltage.

4. In a signaling system, a main line, a transmitting circuit and a receiving circuit associated therewith for duplex operation, means for recording the unbalance voltage produced in the receiving circuit by a transmitted impulse, a circuit connected to the receiving circuit for counteracting the unbalanced voltage therein and means for superimposing in the last named circuit successive reproductions of the recorded voltage, spaced at time intervals corresponding to the intervals of the transmitted impulses.

5. In a signaling system, a main line, a transmitting circuit and a receiving circuit associated therewith for duplex operation, means for recording the unbalance voltage in the receiving circuit due to a transmitted impulse, means for reproducing the recorded voltage, a circuit connected with the receiving circuit for counteracting the unbalance voltage therein and means controlled by the transmitting circuit for connecting said reproducing means to said counteracting circuit in the correct relation to counteract the unbalance voltage.

6. In a signaling system, a main line, a transmitting circuit and a receiving circuit associated therewith for duplex transmission, a circuit connected with the receiving circuit for counteracting therein the unbalance voltage due to a transmitted impulse and means for creating in said counteracting circuit a voltage equal and opposite to the said unbalance voltage.

7. In a signaling system, a main line, a transmitting circuit and a receiving circuit associated therewith for duplex operation, a circuit connected with said receiving circuit for counteracting therein the unbalance voltage due to a transmitted impulse, means for creating a plurality of voltages equal to the unbalance voltages produced by successive transmitted impulses and means for superimposing said created voltages in said counteracting circuit in a direction and at proper intervals to neutralize the overlapping unbalance voltages produced by successive impulses.

8. In a signaling system, a main line, a transmitting circuit and a receiving circuit associated therewith for duplex transmission, means for recording the unbalance voltage due to a transmitted impulse, means for reproducing the recorded voltage and applying it to the receiving circuit in a direction to counteract the unbalance voltage and means for causing the phase of the reproduced voltage to correspond with the phase of the unbalanced voltage.

9. In a signaling system, a main line, a transmitting circuit and a receiving circuit associated therewith for duplex transmission, means for recording the unbalance voltage due to a transmitted impulse, means for reproducing the recorded voltage and applying it to the receiving circuit in a direction to counteract the unbalance voltage and means for preventing a phase displacement of the voltage due to the recording and reproduction of the unbalance voltage.

10. In a signaling system, a main line, a transmitting circuit and a receiving circuit associated therewith for duplex transmission, a recording magnet arranged to be connected across the receiving circuit for recording the unbalance voltage due to a transmitted impulse, means for recording the magnetic effect produced in said magnet, a reproducing circuit connected to the receiving circuit and including a magnet affected by said record, said recording circuit including a resistance of high impedance and a capacity of relatively low impedance and an amplifier having its input circuit connected across said capacity whereby the recorded voltage is displaced substantially 90° with respect to the unbalance voltage.

11. The method of avoiding the effects of unbalance on the receiving circuit of a duplex signalling system, which consists in first making a close copy of the impulse in the receiving circuit due to the unbalance, creating outside the signaling system an impulse corresponding to said copy in strength, wave form and duration, and applying this impulse to the receiver so as to neutralize any balance impulse therein.

12. The method of counteracting the unbalance effect in the receiving circuit of a duplex signaling system, which consists in making a record of the unbalance impulse across the receiving circuit due to transmitted impulse, reproducing the recorded impulse at intervals corresponding to those of transmitted impulses, and applying the reproduced impulses to the receiver so as to counteract the unbalance effect due to the corresponding transmitted impulse.

In testimony whereof, I have signed my name to this specification this 12th day of November, 1919.

OTTO B. BLACKWELL.